(12) United States Patent
Trompezinski et al.

(10) Patent No.: US 12,311,783 B2
(45) Date of Patent: May 27, 2025

(54) METHOD OF VENTING A PRESSURIZED HYDROGEN GAS FROM A HYDROGEN STATION TESTING DEVICE

(71) Applicant: L'Air Liquide, Societe Anonyme pour l'Etude et l'Exploitation des Procedes Georges Claude, Paris (FR)

(72) Inventors: Samuel Trompezinski, Sassenage (FR); Francis Eynard, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 513 days.

(21) Appl. No.: 17/544,861

(22) Filed: Dec. 7, 2021

(65) Prior Publication Data

US 2023/0173925 A1 Jun. 8, 2023

(51) Int. Cl.
*B60L 3/00* (2019.01)
*F17C 5/06* (2006.01)
(Continued)

(52) U.S. Cl.
CPC .............. *B60L 3/0053* (2013.01); *F17C 5/06* (2013.01); *F17C 13/02* (2013.01); *G01M 99/008* (2013.01); *G05D 16/2013* (2013.01); *H01M 8/04201* (2013.01); *F17C 2201/054* (2013.01); *F17C 2203/0646* (2013.01);
(Continued)

(58) Field of Classification Search
CPC ................ F17C 7/00; F17C 2201/0104; F17C 2205/0142; F17C 2221/012; F17C 2227/0157; F17C 2250/032; F17C 2250/0443; F17C 2265/065; F17C 2270/0168; F17C 2270/0184; F17C 2203/0636; F17C 2203/0646; F17C 2203/0665; F17C 2205/0332; F17C 2223/0123; F17C 2223/036; F17C 2225/0123; F17C 2225/036; F17C 2250/034; F17C 2250/043; F17C 2250/0439; F17C 2260/024;
(Continued)

(56) References Cited

U.S. PATENT DOCUMENTS

2006/0260950 A1* 11/2006 Mitlitsky .......... H01M 8/04089
205/637
2015/0308621 A1* 10/2015 Mathison .................. F17C 5/06
141/94
(Continued)

FOREIGN PATENT DOCUMENTS

CN      109556984 A  *  4/2019  ............... G01N 3/60
KR      102070948 B1 *  4/2020

OTHER PUBLICATIONS

Johnson, Terry, "Development of the Hydrogen Station Equipment Performance (HyStEP) Device," H2First Hydrogen Fueling Infrastructure Research and Station Technology, Project ID# TV026, Sandia National Laboratories, Jun. 9, 2016, 30 pgs.
(Continued)

*Primary Examiner* — Kristina M Deherrera
*Assistant Examiner* — Fatemeh Esfandiari Nia
(74) *Attorney, Agent, or Firm* — Justin K. Murray

(57) ABSTRACT

The disclosure generally describes a method for venting pressurized hydrogen gas from a device for simulating a refueling operation for a fuel cell electric vehicle (FCEV).

15 Claims, 1 Drawing Sheet

(51) Int. Cl.
  *F17C 13/02*     (2006.01)
  *G01M 99/00*     (2011.01)
  *G05D 16/20*     (2006.01)
  *H01M 8/04082*   (2016.01)

(52) U.S. Cl.
  CPC .......... *F17C 2203/0665* (2013.01); *F17C 2205/0142* (2013.01); *F17C 2205/0332* (2013.01); *F17C 2205/0338* (2013.01); *F17C 2221/012* (2013.01); *F17C 2223/036* (2013.01); *F17C 2223/0123* (2013.01); *F17C 2225/0123* (2013.01); *F17C 2225/036* (2013.01); *F17C 2227/048* (2013.01); *F17C 2250/032* (2013.01); *F17C 2250/043* (2013.01); *F17C 2250/0439* (2013.01); *F17C 2260/024* (2013.01); *F17C 2270/0139* (2013.01); *H01M 2250/20* (2013.01)

(58) Field of Classification Search
  CPC ............ F17C 2270/0139; F17C 13/02; G01M 99/008; Y02E 60/32
  See application file for complete search history.

(56) References Cited

U.S. PATENT DOCUMENTS

| 2016/0123536 A1* | 5/2016 | Grimmer | F17C 5/06 141/4 |
| 2017/0146194 A1* | 5/2017 | Youlio | F17C 5/06 |
| 2020/0156923 A1* | 5/2020 | Li | B67D 7/36 |
| 2023/0184388 A1* | 6/2023 | Szoucsek | F17C 13/04 137/561 R |
| 2023/0204159 A1* | 6/2023 | Werlen | F17C 7/02 141/5 |

OTHER PUBLICATIONS

Hecht, et al., "Development of the Hydrogen Station Equipment Performance (HyStEP) Device," SAND2017-12046E. Sania National Laboratories, 2017, 27 pgs.

Johnson, Terry, "Initial Testing with the HyStEP Device," SAND2016-1622PE, Sandia National Laboratories, Feb. 25, 2016, 23 pgs.

Johnson, et al., "VII.C.2 Development of the Hydrogen Station Equipment Performance (HyStEP) Device," Sandia National Laboratories, DOE Hydrogen and Fuel Cells Program, FY 2016 Annual Progress Report, 2016, pp. 1-5.

Unknown Author, "Development of the HyStEP Device," Sandia National Laboratories, SAND2015-1387C, Jul. 20, 2015, pp. 1-13.

Johnson, Terry, "Hydrogen Station Equipment Performance Device (HyStEP Device) Specification," Sep. 10, 2014, pp. 1-7.

Unknown Author, HyStEP—PL-00742 Mechanical Drawing Package. pdf, Downloaded from <https://h2tools.org/hystep-hydrogen-station-equipment-performance-device> on Nov. 24, 2021, 10 pgs.

Powertech, Hydrogen Station Equipment Performance (HyStEP) Device Operation and Maintenance Manual, Powertech Labs Inc., Copyright 2015, Downloaded from <https://h2tools.org/hystep-hydrogen-station-equipment-performance-device> on Nov. 24, 2021, 125 pgs.

* cited by examiner

METHOD OF VENTING A PRESSURIZED HYDROGEN GAS FROM A HYDROGEN STATION TESTING DEVICE

FIELD OF THE INVENTION

The disclosure relates to testing and certification of Hydrogen dispensing systems for fuel cell electric vehicles (FCEVs).

BACKGROUND ART

Currently, dispensers for refilling FCEVs are tested and validated with a test vehicle. While this is generally adequate to clear/not clear a dispenser, test vehicles are limited in the amount of data that can be collected and analyzed to identify specific issues. Further, a test vehicle can only be used with on dispenser, and one nozzle thereof, at a time.

Some technology providers have deployed alternative devices to substitute for a test FCEV. These include the Hydrogen Dispenser Testing Apparatus (HDTA) by CSA Group Testing & Certification Inc. This is a proprietary device and therefore limited information regarding it is available. The HDTA is used in conjunction with open source software. Sprik, Sam, and Terlip, Danny. HDTADA. Computer Software. https://github.com/NREL/HDTADA. USDOE Office of Energy Efficiency and Renewable Energy (EERE), Building Technologies Office (EE-5B). 18 Oct. 2018. Web. doi:10.11578/dc.20190204.1. The US Department of Energy funded a public project for another device, the Hydrogen Station Equipment Performance (HyStEP) Device. This publically available technology is accessible via <https://h2tools.org/hystep-hydrogen-station-equipment-performance-device>.

SUMMARY OF INVENTION

There is disclosed an apparatus for simulating a FCEV refilling process, the apparatus comprising: a) at least two inlets operable to form a gas tight connection with a hydrogen refueling station dispensing nozzle, b) a set of at least two banks of gas cylinders in fluid communication with only one of the at least two inlets, wherein the at least two banks of gas cylinders are configured to receive a gaseous hydrogen under pressure from the inlet with which said bank is in fluid communication, c) an outlet for each cylinder of each bank of cylinders, the outlets of all cylinders from all banks of cylinders being in fluid communication with a common vent stack, d) the vent stack configured and adapted to vent the pressurized hydrogen gas from the banks of cylinders, and e) a computer specifically programed to operate the apparatus to perform a hydrogen gas transfer from the hydrogen refueling station dispensing nozzle to each of the separate banks of gas cylinders. The apparatus is further configured for and adapted to vent the pressurized hydrogen gas from the banks of cylinders at a substantially constant depressurization ramp rate.

There is also described a method of venting hydrogen from the above-disclosed apparatus, the method comprising: a) connecting at least two dispensing nozzles of a hydrogen refueling station to at least two separate inlets of the apparatus, b) activating a hydrogen refueling station's hydrogen gas dispenser, that is fluidically connected with the dispensing nozzles, to feed a pressurized hydrogen gas into the at least two inlets of the apparatus, c) receiving the pressurized gaseous hydrogen into the banks of cylinders, and d) venting the pressurized gaseous hydrogen from the banks of cylinders at a substantially constant depressurization ramp rate.

The above-described apparatus and/or method may include one or more of the following aspects:
- the computer is further specifically programmed to execute a substantially constant depressurization ramp rate of the pressurized hydrogen gas from the banks of cylinders.
- the apparatus further comprises a valve in fluid communication with the banks of cylinders and the vent stack, wherein the valve is configured for and adapted to regulate a flow of gas there through based on a pressure of a gas upstream of the valve.
- the valve is a dome loaded pressure regulator.
- the specific programming comprises a proportional-integral-derivative (PID) control loop adapted to execute the substantially constant depressurization ramp rate.
- the valve is configured for and adapted to regulate a flow of gas there through based on a pressure of a gas upstream of the valve by an iterative series or a substantially continuous decrease in the set-point of the valve.
- the iterative series or the substantially continuous decrease in the set-point of the valve controlled proportional-integral-derivative (PID) control loop adapted to execute the substantially constant depressurization ramp rate.
- the apparatus comprises a second computer specifically programmed to execute a substantially constant depressurization ramp rate of the pressurized hydrogen gas from the banks of cylinders.
- the substantially constant depressurization ramp rate is +/−5% of a defined depressurization ramp rate.
- the apparatus further comprises a valve in fluid communication with the banks of cylinders and the vent stack, wherein the valve is configured for and adapted to regulate a flow of gas there through based on a pressure of a gas upstream of the valve.
- the valve is a dome loaded pressure regulator.
- a substantially constant depressurization ramp rate is performed, at least in part, by regulating a flow of gas there through based on a pressure of a gas upstream of the valve by an iterative series or a substantially continuous decrease in the set-point of the valve.
- the iterative series or the substantially continuous decrease in the set-point of the valve is controlled by a proportional-integral-derivative (PID) control loop.

Disclosure of Invention

DETAILED DESCRIPTION

Figure 1:
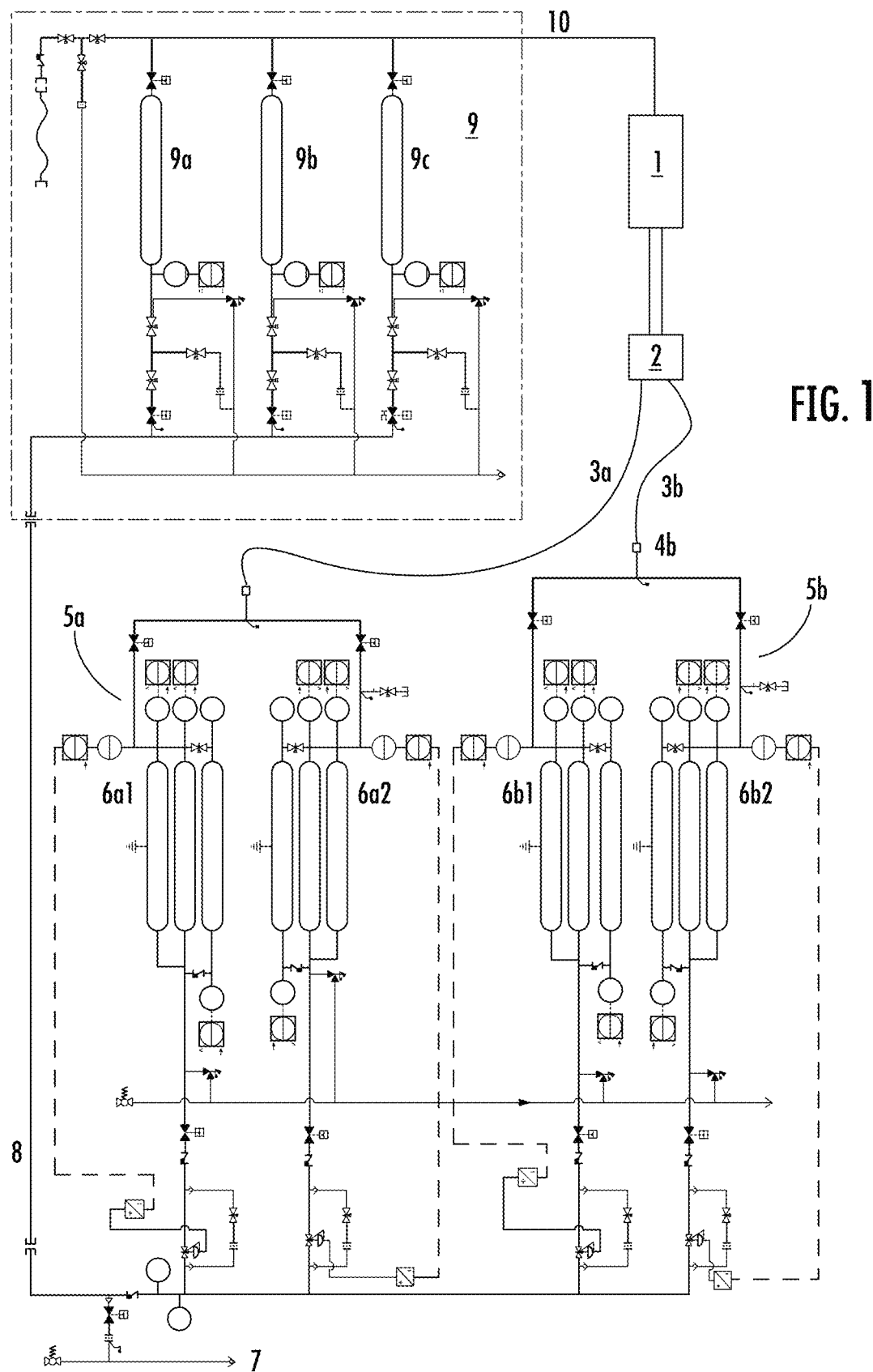
FIG. 1 shows an embodiment of the apparatus connected to the optional recycle system.

The disclosure generally describes an apparatus for simulating a refueling operation for a fuel cell electric vehicle (FCEV). The fuel is compressed hydrogen gas dispensed by hydrogen refueling station (HRS). Generally, the HRS is designed, built and operated to comply with various codes and standardized procedures. Exemplary codes and procedures are those published by SAE International:
- SAE J2601 Fueling Protocols for Light Duty Gaseous Hydrogen Surface Vehicles.
- SAE J2799 Hydrogen Surface Vehicle to Station Communications Hardware and Software SAE J2600 Compressed Hydrogen Surface Vehicle Fueling Connection Devices These standards are broadly recognized by US regulatory authorities as applicable standards for permitting HRS. But the apparatus described herein is adaptable to virtually any alternative codes or procedures.

The apparatus described herein advantageously allows an operator to a) collect more detailed information during a test refueling; b) test in parallel two or more dispenser nozzles connected to a common dispenser to facilitate identification and location of any issues within the dispenser system, e.g. a problem with a common valve versus a problem with one nozzle; and c) test dispenser nozzles on two or more different dispensers in parallel to further identify issues specific to a dispenser or stemming from a common upstream element associated with both dispensers.

Compared to a test vehicle, the apparatus herein also advantageously:

Can have larger hydrogen receptacle tanks to thereby allow for multiple refilling simulations before the accumulated hydrogen has to be emptied, thereby speeding up the process of testing a HRS;

Can be purposefully configured to safely and efficiently vent accumulated hydrogen; and Can be configured to recycle some or all of the accumulated hydrogen back into the HRS, thereby avoiding loss of hydrogen inventory from a specific HRS as a consequence of testing and validation.

Embodiments will now be described for an apparatus adapted for a use with a HRS following J2601, J2799 and J2600.

The apparatus is equipped with two independent H70 receptacles. Each receptacle is connected to two independent banks of three 48 L ASME Type II cylinders. For an apparatus with two H70 receptacles, a total of four (4) banks of 144 L is available. H70 is approximately 70 MPa/10,000 PSI. Alternative embodiments may have three or more receptacles, one or more of which may be instead H35 receptacles (35 MPa/5,000 PSI).

Each bank is equipped with one or more pressure sensors and, preferably, at least three temperature sensors, configured and adapted to measure State Of Charge (SoC) of the bank and manage hydrogen temperature for safety. The apparatus is configured with J2799 compliant infrared communication device(s) to enable the apparatus to simulate a FCEV refill with such a communication link. The apparatus is controlled by a specifically programmed computer with software adapted to operate the apparatus and collect and analyze the resulting data for evaluation of compliance with the applicable standard (e.g. J2601). In some embodiments, the software is adapted from the publically available HDTADA software.

Each bank can be vented separately and in a controlled manner (via a pressure ramp rate control for example). The apparatus is configured for and adapted to enable filling two banks while the two other banks are venting. Thanks to the four individual banks, the system is capable to simulate continuous 4-7 Kg category back-to-back fills (the detailed system fill capacity are given in the table below) on two dispenser nozzles. The back-to-back fills can be performed manually or in an automated mode.

All vent banks are preferably connected to a single vent stack. The vent stack can be connected either to the atmosphere, to a remote vent outlet, such as one for a dispenser or a HRS.

The recycling system may consist of three independent Type I cylinders of a minimum of 1 m³ and enables recovery of up to 100% of the vented hydrogen for recycle back to the HRS, such as at a hydrogen pump intake of the HRS.

Embodiments having four or more banks are capable of continuous refueling simulations by having some banks receiving hydrogen while other banks vent or send hydrogen to recycle.

Embodiments connected to a recycle system are operable continuously and for an unlimited number of refill simulations due to the closed loop recycling of the gaseous hydrogen back to the HRS being tested.

FIG. 1 shows an embodiment of the apparatus connected to the optional recycle system. The HRS (1) has at least one dispenser (2) which in turn has two hydrogen gas dispensing lines (3a, 3b), each with nozzles (4a, 4b). The Apparatus has two separately operable banks (5a, 5b) of cylinders configured and adapted to independently execute a simulated refill of a FCEV using the SAE protocols identified above (or optionally other protocols). Each bank has a complement of individual gas cylinders (6a1, 6a2, 6b1, 6b2), generally three cylinders. Preferably the cylinders are Type II cylinders (aluminum, hoop-wrapped with carbon fiber). The apparatus has a common vent stack (7) for evacuating hydrogen from the banks. An optional feature is shown with conduit (8) directing the hydrogen gas to recycle system 9 instead. Recycle system (9) has a plurality of cylinders, generally three and preferably Type I cylinders (9a, 9b, 9c). Recycle system (9) feeds the hydrogen back into the HRS (1) for further use.

In embodiments comprising venting hydrogen via vent stack (7), a preferred method of venting is based on a constant pressure ramp rate. Variable pressure ramp rates cause hydrogen gas expansion temperature effects reflected in the mass average enthalpy of the hydrogen. The SAE J2601 (2016 edition) explains this issue from the perspective of hydrogen gas filling. But the same issues pertain to hydrogen gas venting. To mitigate temperature and pressure changes in the pressurized hydrogen gas during venting, the apparatus can be configured to maintain a constant depressurization ramp rate. The apparatus in one embodiment for implementing the method uses a valve (11), a pressure sensor (12) and a proportional-integral-derivative (PID) control loop (13) to control depressurization through the vent stack (7). In preferred embodiments, the set point of the valve is continuously decreased based on the depressurization ramp rate. The computer controlling the apparatus can be specifically programed to execute the PID control based on the pressure sensor to actuate the valve to maintain the constant depressurization ramp rate. In some preferred embodiments, the valve (11) is a dome loaded back pressure regulator. A "substantially constant depressurization ramp rate" means a constant depressurization ramp rate allowing for variations in the instantaneous ramp rate due to limitations of the apparatus hardware, generally no more than +/−5% at any specific time point during a depressurization process.

INDUSTRIAL APPLICABILITY

The present invention is at least industrially applicable to testing and validating the correct functioning of hydrogen dispensing systems for refueling FCEVs.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An apparatus for simulating a fuel cell electric vehicle (FCEV) refilling process, the apparatus comprising:
   a) at least two inlets operable to form a gas tight connection with a hydrogen refueling station dispensing nozzle;
   b) a set of at least two banks of gas cylinders, wherein each bank of gas cylinders is in fluid communication with only one of the at least two inlets, wherein the at least two banks of gas cylinders are configured to receive a gaseous hydrogen under pressure from the inlet with which said bank is in fluid communication;
   c) an outlet for each cylinder of each bank of cylinders, the outlets of all cylinders from all banks of cylinders being in fluid communication with a common vent stack;
   d) the vent stack configured and adapted to vent the pressurized hydrogen gas from the banks of cylinders; and
   e) a computer specifically programed to operate the apparatus to perform a hydrogen gas transfer from the hydrogen refueling station dispensing nozzle to each of the separate banks of gas cylinders,
   f) wherein the apparatus is further configured for and adapted to vent the pressurized hydrogen gas from the banks of cylinders at a substantially constant depressurization ramp rate.

2. The apparatus of claim 1, the computer is further specifically programmed to execute a substantially constant depressurization ramp rate of the pressurized hydrogen gas from the banks of cylinders.

3. The apparatus of claim 1, wherein the apparatus further comprises a valve in fluid communication with the banks of cylinders and the vent stack, wherein the valve is configured for and adapted to regulate a flow of gas there through based on a pressure of a gas upstream of the valve.

4. The apparatus of claim 3, wherein the valve is a dome loaded pressure regulator.

5. The apparatus of claim 2, wherein the specific programming comprises a proportional-integral-derivative (PID) control loop adapted to execute the substantially constant depressurization ramp rate.

6. The apparatus of claim 3, wherein the valve is configured for and adapted to regulate a flow of gas there through based on a pressure of a gas upstream of the valve by an iterative series or a substantially continuous decrease in the set-point of the valve.

7. The apparatus of claim 6, wherein the iterative series or the substantially continuous decrease in the set-point of the valve controlled proportional-integral-derivative (PID) control loop adapted to execute the substantially constant depressurization ramp rate.

8. The apparatus of claim 1, comprising a second computer specifically programmed to execute a substantially constant depressurization ramp rate of the pressurized hydrogen gas from the banks of cylinders.

9. A method of venting hydrogen from the apparatus of claim 1, the method comprising:
   a) providing the apparatus as claimed in claim 1;
   b) connecting at least two dispensing nozzles of a hydrogen refueling station to at least two separate inlets,
   c) activating a hydrogen refueling station's hydrogen gas dispenser, that is fluidically connected with the dispensing nozzles, to feed a pressurized hydrogen gas into the at least two inlets,
   d) receiving the pressurized gaseous hydrogen into the banks of cylinders, and
   e) venting the pressurized gaseous hydrogen from the banks of cylinders at a substantially constant depressurization ramp rate.

10. The method of claim 9, wherein the substantially constant depressurization ramp rate is +/−5% of a defined depressurization ramp rate.

11. The method of claim 9, wherein the apparatus further comprises a valve in fluid communication with the banks of cylinders and the vent stack, wherein the valve is configured for and adapted to regulate a flow of gas there through based on a pressure of a gas upstream of the valve.

12. The method of claim 11, wherein the valve is a dome loaded pressure regulator.

13. The method of claim 11, wherein the substantially constant depressurization ramp rate is performed, at least in part, by regulating a flow of gas there through based on a pressure of a gas upstream of the valve by an iterative series or a substantially continuous decrease in the set-point of the valve.

14. The method of claim 13, wherein the iterative series or the substantially continuous decrease in the set-point of the valve is controlled by a proportional-integral-derivative (PID) control loop.

15. The apparatus of claim 1, wherein the at least two inlets comprise a first inlet and a second inlet, wherein the set of at least two banks comprises a first bank of gas cylinders and a second bank of gas cylinders, wherein the first inlet is fluidly connected only to the first bank of gas cylinders and the second inlet is fluidly connected only to the second bank of gas cylinders, such that the first bank of gas cylinders are not in fluid communication with the second inlet and the second bank of gas cylinders are not in fluid communication with the first inlet.

* * * * *